W. TIERNAN & H. M. SCHREIBER.
DRAFT APPLIANCE.
APPLICATION FILED FEB. 9, 1909.
942,599.
Patented Dec. 7, 1909.
2 SHEETS—SHEET 1.
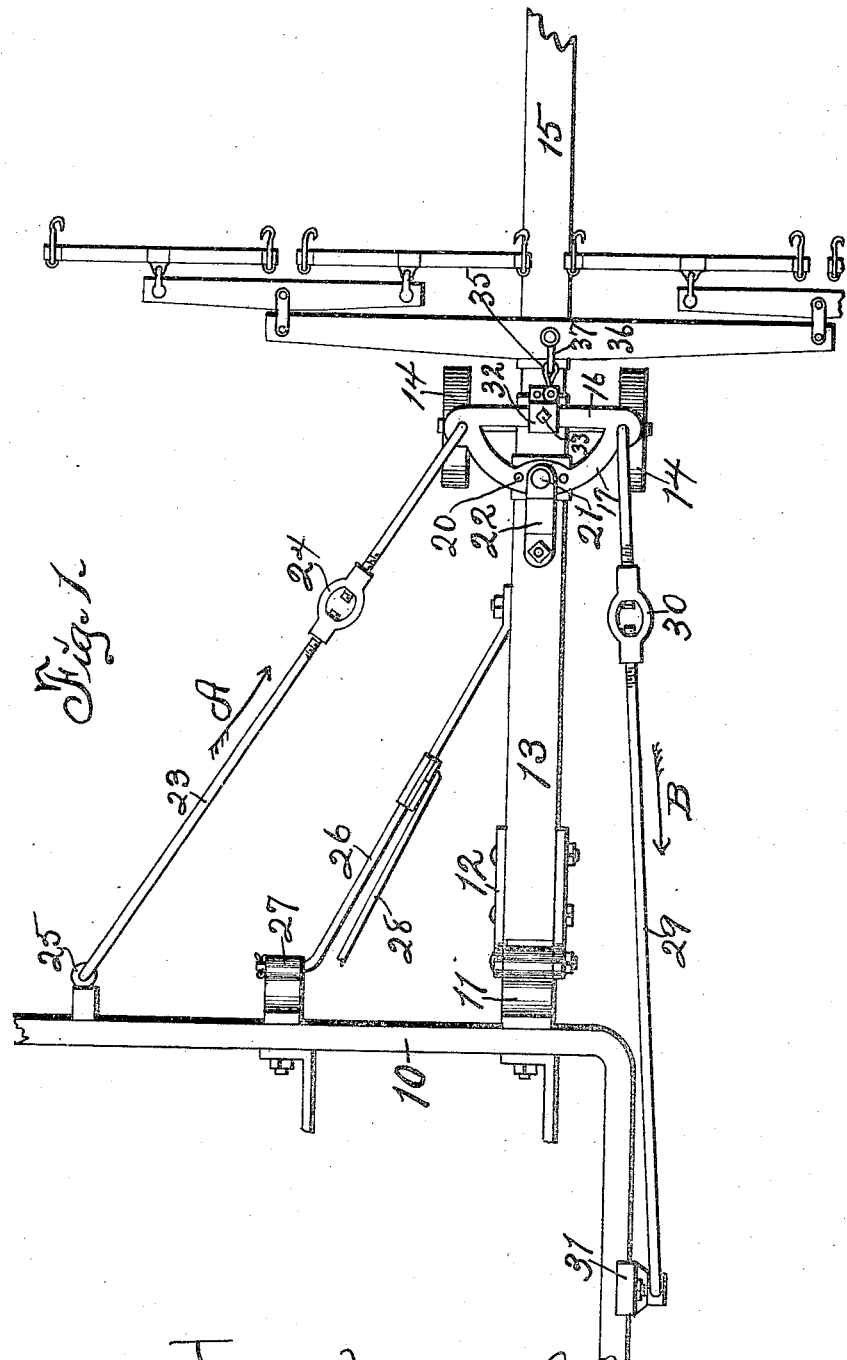

W. TIERNAN & H. M. SCHREIBER.
DRAFT APPLIANCE.
APPLICATION FILED FEB. 9, 1909.
942,599.
Patented Dec. 7, 1909.
2 SHEETS—SHEET 2.
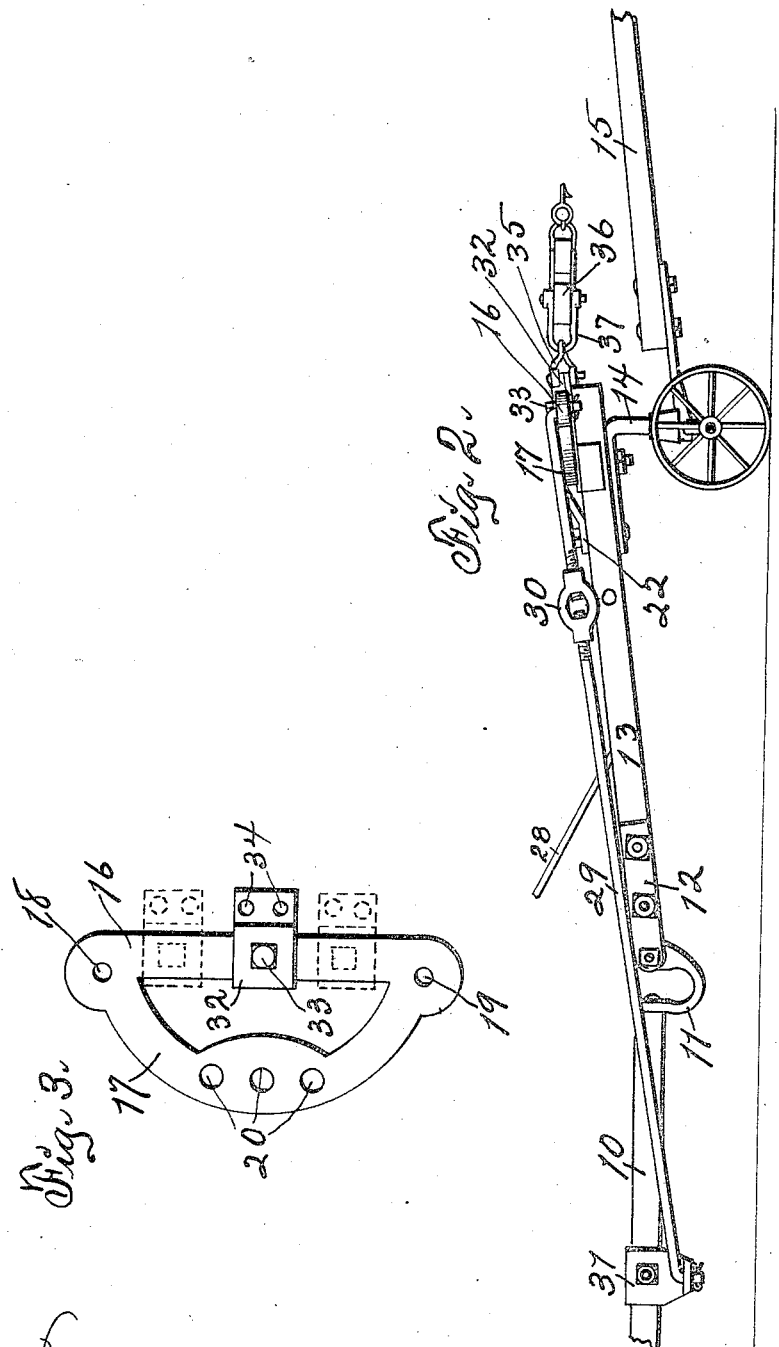

UNITED STATES PATENT OFFICE.

WILLIAM TIERNAN AND HENRY M. SCHREIBER, OF ROLFE, IOWA.

DRAFT APPLIANCE.

942,599.  Specification of Letters Patent.  Patented Dec. 7, 1909.

Application filed February 9, 1909. Serial No. 477,469.

*To all whom it may concern:*

Be it known that we, WILLIAM TIERNAN and HENRY M. SCHREIBER, citizens of the United States, residing at Rolfe, in the county of Pocahontas and State of Iowa, have invented a new and useful Draft Appliance, of which the following is a specification.

The object of this invention is to provide an improved construction for a draft appliance.

A further object of this invention is to provide improved means for conjunctively using a supporting truck and hitching connections.

A further object of this invention is to provide adjustable connections between an evener plate and the frame of a machine, implement or device to be drawn.

A further object of this invention is to provide an improved connection between swingletrees and an evener plate.

Our invention consists in the construction, arrangement and combination of elements hereinafter set forth, pointed out in our claims and illustrated by the accompanying drawings, in which—

Figure 1 is a plan of the device, a portion of the swingletrees being broken away. Fig. 2 is a side elevation of the same devices. Fig. 3 is a plan, on enlarged scale, of the evener plate and slidable clevis, the dotted lines showing various positions of the clevis.

In the construction of the device as shown the numeral 10 designates the forward portion of the frame of the harvester. This frame is shown conventionally and may be of any desired form or shape and may apply to any machine, implement or device to be drawn, to which the other elements are applicable. A hinge member 11 is bolted to the frame 10 and is pivotally connected to a hinge member 12 on a stub-tongue 13, the axes of the pivotal connection being horizontal. A tongue-truck 14, of any desired form, is located beneath and supports the outer end portion of the stub-tongue 13 and devices carried thereby. A steering tongue 15 may be attached to the tongue-struck 14 and extend forward therefrom if desired.

An evener plate is provided and is constructed with a straight front bar 16 and a curved rear bar 17 joined at their ends integrally. Holes 18, 19 are formed in end portions of the evener bar and holes 20, in this instance three in number, are formed in a row in the central portion of the curved rear bar 17. The evener plate is mounted transversely of the forward end portion of the stub-tongue 13 and a king bolt 21 is mounted through one or the other of the holes 20 and extends through said stub-tongue and also through a hammer-strap 22 fixed to the stub-tongue and extending across the bar 17 of said evener plate. A brace 23, adjustable as to length by a turn buckle 24, is hooked at its ends through the hole 18 of the evener bar and through an eye 25 on the frame 10 and laterally removed from the hinge member 11. A brace 26 is connected at one end to the stub tongue 13 at the rear of the evener plate and is pivoted at the other end in a bracket 27 extending forward from the frame 10 between the hinge member 11 and the eye 25. A rod 28 leads from the brace 26 to lever mechanism (not shown) which may be located on the implement and employed to tip the implement relative to the stub-tongue. The brace 26 and rod 28 are shown conventionally and form no part of our invention. A brace 29, adjustable as to length by a turn-buckle 30, is hooked at its ends through the hole 19 of the evener plate and through a hole in a bracket 31 fixed to the frame 10 and preferably extending at right angles to the eye 25. It will be observed that the braces 23 and 29 are on opposite sides of the stub-tongue 13. A clevis 32 is slidingly mounted on the front bar 16 of the evener plate and is adapted to be moved into any desired position longitudinally of said bar (see dotted lines in Fig. 3) and be secured thereto by a set screw 33. The forward portion of the clevis 32 is formed with a plurality of laterally separated holes 34 and a clevis 35 is engaged therewith by means of one or the other of said holes. A swingletree 36 is connected to the clevis 35 by a clevis 37. The swingletree may be arranged for as many draft animals as is desired and we have shown it of conventional form adapted to receive four animals.

It will be observed that the clevis 32 also rides on the forward end portion of the stub-tongue 13.

It will be observed that the relation of the draft to the following machine may be adjusted by means of the holes 20 in the evener plate, or by means of the clevis 32 on the evener plate or by means of the clevis 35 and holes 34 or by means of the turn-buckles 24 and 30.

Assuming that the side draft of the following machine is on the left side of the stub-tongue, the parts may be assembled as shown and the braces 23, 29 be tightened. The clevis 32 may be moved to its leftmost position, or the evener plate may be moved to the left, or the clevis 35 may be moved to the left, or all such adjustments may be made, until such experiment determines the proper relation of the clevis 37 to the side draft of the machine at which time it will be found that the draft of the animals will move the machine forward on a true line.

We claim as our invention—

1. The combination of a machine frame, a stub-tongue hinged to said frame, an evener plate formed with a straight front bar and a curved rear bar connected at their ends, the curved rear bar of the plate formed with a transverse row of holes, the evener plate arranged horizontally on the stub-tongue and pivoted thereto by a king bolt extending through one or another of said holes, adjustable braces on opposite sides of said stub-tongue and pivotally connecting end portions of the evener plate to said frame, a clevis mounted for lateral sliding adjustment on the front bar of the evener plate in front of said king bolt, means for locking said clevis to the plate, and means for attaching swingletrees to said clevis.

2. The combination of a machine frame, a stub-tongue hinged to said frame, an evener plate mounted horizontally on the forward end portion of said stub-tongue, said evener plate formed with a straight front bar and a curved rear bar connected at their ends, the curved rear bar of the plate formed with a transverse row of holes, a king bolt mounted loosely through one or another of said holes and extending through the stub-tongue, adjustable braces on opposite sides of said stub-tongue and connecting end portions of the evener plate to said frame, a clevis mounted for lateral sliding adjustment on the front bar of the evener plate in front of said king bolt, a set screw in said clevis adapted to engage said front bar, means for attaching swingletrees to said clevis, and a tongue-truck beneath and supporting the forward end portion of said stub-tongue.

3. The combination of a machine frame, a stub-tongue hinged to said frame, an evener plate mounted horizontally on the forward end portion of said stub-tongue, said evener plate formed with a straight front bar and a curved rear bar connected at their ends, the curved rear bar of the plate formed with a transverse row of holes, a king bolt mounted loosely through one or another of said holes and extending through the stub-tongue, adjustable braces on opposite sides of said stub-tongue and connecting end portions of the evener plate to said frame, a clevis mounted for lateral sliding adjustment on the front bar of the evener plate in front of said king bolt, said clevis resting on said stub-tongue, a set screw in said clevis adapted to engage said front bar, said clevis formed with a series of vertical holes in front of said evener plate, another clevis engaging in one or another of said vertical holes, a swingletree engaging the latter clevis, and a tongue-truck beneath and supporting the forward end portion of said stub-tongue.

4. The combination of a machine frame, a stub-tongue hinged to said frame, an evener plate pivotally mounted on said stub-tongue and adjustable laterally thereof, adjustable braces on opposite sides of said stub-tongue and connecting end portions of the evener plate to said frame, a clevis mounted for lateral sliding adjustment on the evener plate in front of the pivot of said plate, means for locking said clevis to the plate, and means for attaching swingletrees to said clevis.

5. The combination of a machine frame, a stub-tongue hinged to said frame, an evener plate pivotally mounted on said stub-tongue and adjustable laterally thereof, adjustable braces on opposite sides of said stub-tongue and connecting end portions of the evener plate to said frame, a clevis mounted for lateral sliding adjustment on the evener plate in front of the pivot of said plate, means for locking said clevis to the plate, means for attaching swingletrees to said clevis, and a tongue-truck beneath and supporting the forward end portion of said stub-tongue.

6. The combination of a machine frame, a stub-tongue hinged to said frame, an evener plate pivoted to said stub-tongue and adapted to be adjusted transversely thereof, braces on opposite sides of said stub-tongue and connecting end portions of the evener plate to said frame, said braces adjustable as to length, a clevis slidingly mounted on the evener plate in front of the pivot of said plate and adapted to be adjusted transversely of said stub-tongue, means for locking said clevis to the plate, another clevis pivoted to the first clevis and adjustable transversely thereof, means for attaching swingletrees to the latter clevis, and a tongue-truck beneath and supporting the forward end portion of said stub-tongue.

WILLIAM TIERNAN.
HENRY M. SCHREIBER.

Witnesses:
JOHN G. KIRCHNER,
FRED COX.